US007897704B2

(12) United States Patent
Masselin et al.

(10) Patent No.: US 7,897,704 B2
(45) Date of Patent: Mar. 1, 2011

(54) COMPOSITION OF DIEPOXY RESIN MODIFIED WITH MONOFUNCTIONAL ORGANIC MATERIAL AND DICARBOXYLIC ACID AND CROSSLINKER

(75) Inventors: Andre Masselin, La Neuville du Bosc (FR); Tung-Fai Lo, Angicourt (FR); Pascal Helias, Vraiville (FR); Francis Couaillet, Poses (FR)

(73) Assignee: Akzo Nobel N.V., Arnhem (NL)

( * ) Notice: Subject to any disclaimer, the term of this patent is extended or adjusted under 35 U.S.C. 154(b) by 742 days.

(21) Appl. No.: 10/594,468

(22) PCT Filed: Mar. 21, 2005

(86) PCT No.: PCT/EP2005/003047
§ 371 (c)(1),
(2), (4) Date: Dec. 17, 2007

(87) PCT Pub. No.: WO2005/095483
PCT Pub. Date: Oct. 13, 2005

(65) Prior Publication Data
US 2008/0193689 A1 Aug. 14, 2008

(30) Foreign Application Priority Data
Mar. 29, 2004 (EP) .................................... 04290827

(51) Int. Cl.
*B05D 3/02* (2006.01)
*B32B 15/08* (2006.01)
*C08L 63/02* (2006.01)

(52) U.S. Cl. ........................... 525/533; 427/386; 428/418
(58) Field of Classification Search ........................ None
See application file for complete search history.

(56) References Cited

U.S. PATENT DOCUMENTS

| 3,355,401 | A | 11/1967 | Tanner |
| 4,098,735 | A | 7/1978 | Tobias |
| 4,413,015 | A | 11/1983 | Anderson et al. |
| 4,686,248 | A | 8/1987 | Bekooij et al. |
| 4,812,537 | A | 3/1989 | Maki |

FOREIGN PATENT DOCUMENTS

| JP | 52-36132 | | 3/1977 |
| JP | 4-323277 A | * | 11/1992 |
| WO | WO 01/18133 | | 3/2001 |

* cited by examiner

Primary Examiner — Robert Sellers
(74) Attorney, Agent, or Firm — Kenyon & Kenyon LLP

(57) ABSTRACT

A protective crosslinkable coating composition comprising modified epoxy resin and crosslinker the modified epoxy resin being the reaction product, by weight, of i) from 80 to 99.9 parts of di-epoxy resin of epoxy equivalent weight from 500 to 5000 and formed from the reaction of bis phenol A diglycidyl ether and bis phenol A and ii) from 0.1 to 20 parts of reactive material characterised in that a) the di-epoxy resin contains minor amounts of resin components of molecular weight less than 1000 Daltons, and the reactive material comprises b) mono-functional organic material of molecular weight at: least 100 Daltons having one moiety capable of reacting with the epoxy moieties of the di-epoxy resin and c) dicarboxylic acid of molecular weight less than 300 Daltons having two moieties capable of reacting with the epoxy moieties of the di-epoxy resin.

28 Claims, No Drawings

COMPOSITION OF DIEPOXY RESIN MODIFIED WITH MONOFUNCTIONAL ORGANIC MATERIAL AND DICARBOXYLIC ACID AND CROSSLINKER

CROSS-REFERENCE TO RELATED APPLICATION

This application is the national phase under 35 U.S.C. §371 of PCT International Application No. PCT/EP2005/003047 having an international filing date of Mar. 21, 2005 entitled "COATING COMPOSITION BASED ON MODIFIED EPOXY RESINS", which designated the United States of America, and was published in the English language as International Publication No. WO 2005/095483, which claims the benefit of priority to European Application No. 04290827, filed on Mar. 29, 2004. The disclosure of all of these applications is hereby incorporated in their entirety by reference.

This invention relates to a crosslinkable coating composition, its preparation and use.

Metal food and drink containers, often referred to as cans, are usually coated on the inside to prevent reaction between the contents and the metal from which the can is formed. Such reaction leads both to unwanted deterioration of the can and also potentially damaging effects on the contents, particularly in terms of changes in quality and taste. Without an interior coating, most cans of food or drink would not remain usable for very long. The coating is often applied to the flat metal by roller coating before the can is formed and then dried and/or cured in a stoving operation. Typical oven temperatures used are about 200° C. for 6 to 12 minutes. The can is then formed from the flat metal by a drawing process before being filled with food or drink and finally sealed up.

The coatings are required to have very good flexibility, adhesion, sterilisation resistance, stability properties and blush resistance. Flexibility and adhesion are essential if the coating is to remain intact during the can formation process when the coated flat metal sheet is drawn into the form of the can. When the cans are filled with food, the contents are usually sterilised by heating the sealed can to temperatures of around 130° C. for 1 to 2 hours (depending on the nature of the food). The coating is then in direct contact with the contents of the can for a considerable period of time which could be many years. During sterilisation and subsequent storage, the coating is required to maintain its integrity so as to prevent corrosion of the metal can and to prevent metal migration into the can contents. Additionally, the coating must not impair the contents by releasing unwanted material or by altering the flavour or appearance. These resistance properties impact not only on the shelf life of the product but also on public health and safety. Thus, there are particularly stringent and specific requirements of coating compositions for can interiors which are different from those for other coatings.

U.S. Pat. No. 4,098,735 teaches to react mono-carboxylic acid and di-carboxylic acid with diepoxy resins in order to prevent increases in molecular weight. These water dilutable resins have high acid values and thus require large excesses of dicarboxylic acid over the monocarboxylic acid.

One known type of coating composition for cans is based on epoxy resin formed from the reaction of bis phenol A diglycidyl ether (subsequently referred to as BADGE) with bis phenol A. The reaction produces a resin consisting of a mixture of components rather than a single component. This is because the reactants are difunctional and thus produce a variety of components which can themselves further react with each other or indeed themselves. In this way a resin with very broad molecular weight distribution can result. The low molecular weight resin components below 1000 Daltons, including BADGE, can be especially problematic because they are easily extracted from a crosslinked coating on the interior of a can, thereby contaminating the contents.

Where an excess of BADGE is used, the main component in the resulting resin has an epoxy group at each end of the polymer chain to form a diepoxy resin. When equimolar amounts of BADGE and bis phenol A are reacted together the resultant polymer has a hydroxyl group at one end and an epoxy group at the other. However, resins formed from equimolar amounts of BADGE and bis phenol A tend to be high in viscosity and generally difficult to handle in manufacture. Other than BADGE itself, epoxy resins of the type described above also have secondary hydroxyl groups on the polymer backbone.

The number of epoxy groups per polymer chain is an important characteristic of epoxy resins. The epoxy equivalent weight, referred to as EEW, is often used to indicate this feature. For example the calculated EEW of BADGE is 170, since it has two epoxy groups and has a molecular weight of 340. Reacting two moles of BADGE with one of bis phenol A will produce a diepoxide resin with a theoretical EEW of 454. Of course, since the reactants are difunctional, a statistical mixture of component molecules is produced and the measured EEW can be lower than the theoretical EEW.

Epoxy resin coating compositions comprise an epoxy resin and a crosslinker such as a phenolic resin dissolved or dispersed in an organic liquid. In such compositions the crosslinker reacts predominantly with the epoxy groups and any hydroxyls present on the resin during the stoving operation to form a crosslinked final coating.

Extractable BADGE can be found in known epoxy resin can coating compositions. By extractable is meant that BADGE is detectable in the food and beverages contained in cans, the interiors of which have been coated on the inside with such epoxy resin based coatings and crosslinked. Health concerns have arisen over the appearance of low molecular weight resin components, in particular BADGE appearing in food. As a result, limits of the level of extractable BADGE in the crosslinked coating have been proposed by government and industry bodies, namely less than or equal to 166 micrograms/dm$^2$ (one dm$^2$ is 0.01 m$^2$).

It is generally regarded that resin components below 1000 Daltons are absorbed by the human and mammalian gut. Although limits do not yet exist for these components, nevertheless, keeping these to a minimum is a desirable target of the coatings industry in anticipation of future legislation and existing consumer concerns.

Although not wishing to be bound by this, it is thought that extractable BADGE is present in epoxy resins because the route to the manufacture of such resins involves the reaction of a difunctional epoxy, typically BADGE, with a difunctional hydroxy compound, namely bis phenol A. Since this can produce a material which has a hydroxyl group at one end and an epoxy group at the other end, the resultant molecule can react with a like molecule or a BADGE molecule or a Bis phenol A molecule or a combination. Consequently the stoichiometry of the reaction is extremely complex and total consumption of the reactants is very difficult to achieve, hence the presence of minor amounts of low molecular weight components such as BADGE and bis phenol A in the resin. Alternatively and additionally, such components may be formed and extracted into the can contents during the sterilisation process. Though the level in the resin is very low, even when formulated into a coating and crosslinked, the level of BADGE that is extractable remains above the proposed target referred to above.

The very low level of free BADGE is not easy to achieve by simple modifications of the existing formulations. The problem is particularly acute in smaller cans that have larger interior surface area, and thus more coating, in relation to the volume of contents. The problem is to formulate coatings suitable for cans which meet the requirements for very low levels of BADGE and other low molecular weight resin components while retaining or improving on all the other required characteristics of, in particular flavour, sterilisation resistance and blush and also solids content, flexibility and adhesion.

The method used to estimate the amount of extractable material involves the coating for testing to be applied to metal, heated to effect crosslinking and the coated metal immersed in acetonitrile. The concentration in the acetonitrile is estimated using a chromatographic technique and the concentration in the crosslinked coating estimated. The method is described in more detail later in this specification.

According to the present invention, there is provided a protective crosslinkable coating composition comprising modified epoxy resin and crosslinker the modified epoxy resin being the reaction product, by weight, of i) from 80 to 99.9 parts of di-epoxy resin of epoxy equivalent weight from 500 to 5000 and formed from the reaction of bis phenol A diglycidyl ether and bis phenol A and ii) from 0.1 to 20 parts of reactive material characterised in that a) the di-epoxy resin contains minor amounts of resin components of molecular weight less than 1000 Daltons, including bis phenol A diglycidyl ether and the reactive material comprises b) mono-functional organic material of molecular weight at least 100 Daltons having one moiety capable of reacting with the epoxy moieties of the di-epoxy resin and c) dicarboxylic acid of molecular weight less than 300 Daltons having two moieties capable of reacting with the epoxy moieties of the di-epoxy resin By minor amount is meant that resin components of molecular weight less than 1000 Daltons, including BADGE comprise less than 50% by weight of the total di-epoxy resin solids, preferably less than 20%, more preferably less than 2%, even more preferably from 0.005% to 1%, still more preferably from 0.01% to 0.5% and most preferably from 0.03% to 0.3%.

Preferably the resin component comprises BADGE.

More preferably the reactive moieties of the organic material react with the epoxy moieties of the di-epoxy resin, especially with the epoxy moieties of the minor amounts of BADGE. This tends to increase the molecular weight of the resin thereby reducing the amounts of resin component below 1000 Daltons, including the extractable BADGE. Preferably the amount of resin components of molecular weight below 1000 Daltons extractable from the crosslinked film is below 125 micrograms/dm$^2$ of crosslinked coating, more preferably from 1 to 100 micrograms/dm$^2$ and most preferably from 1 to 65 micrograms/dm$^2$ as measured by the method below.

Preferably the amount of BADGE extractable from a crosslinked coating of the coating composition is less than 0.3 micrograms/dm$^2$. This exceeds the current industry practice and in any case is safer for consumers. Most preferably still, the amount of extractable BADGE is below 0.2 micrograms/dm$^2$ and the amount of low molecular weight resin components extractable from the crosslinked film is from 1 to 125 micrograms/dm$^2$.

By diepoxy is meant that, on average, the epoxy resin has two epoxy groups per molecule. Preferably the epoxy equivalent weight is from 750 to 4000 and more preferably from 1000 to 2500. Suitable examples of diepoxy resins include Epikote 1004 and Araldite 6084, both being type 4 diepoxy resins, Epikote 1007 is a type 7 and DER 669-20 is a type 9. The word 'type' in this context is generally understood by those skilled in the art to signify the average number of repeating units in the resin backbone. As such, as the type number increases, the molecular weight rises and the EEW for a given number of epoxy moieties will fall.

The diepoxy resin may be preformed in which case it may need to be dissolved in a liquid carrier solvent before being further reacted with the reactive material. Alternatively, the reaction with the reactive material may conveniently follow the manufacture of the diepoxy itself. The latter is preferred as this avoids the additional step of isolating the diepoxy resin from any solvent and then having to redissolve or redisperse it again prior to reaction.

Preferably the coating composition is a liquid as this facilitates applying a thin, even coating to a substrate.

The amount of reactive material used to modify the diepoxy resin is preferably sufficient to react with at least 30% of the number of available epoxy groups of the modified diepoxy resin. If the amount of reactive material selected is only sufficient to react with less than 30% of the available epoxy groups, the amount of extractable BADGE and other low molecular weight resin components, although reduced, normally remains unacceptably high. More preferably, the amount of reactive material chosen is sufficient to react with from 30 to 90% of the epoxy groups of the resin as this leaves some epoxy groups available for crosslinking. Even more preferably, it is from 40 to 80% and most preferably, from 50 to 75%. The number of available epoxy groups can be readily estimated by titration with perchloric acid.

It is advantageous to limit the amount of reactive material used to modify the di-epoxy resin to below 25% by weight of the modified epoxy resin. More preferred is from 1 to 20%, more preferred is from 1 to 15% and most preferred is from 4 to 10%. This ensures that the properties of the cured coating are sufficient to survive the sterilisation process.

The reactive material capable of reacting with the epoxy moieties of the diepoxy resin preferably comprises amine, phenol and/or carboxylic acid moieties. More preferably the moiety capable of reacting with the diepoxy resin is carboxyl. Still more preferably the reactive material is organic carboxylic acid. Even more preferably the total organic carboxylic acid content of the modified epoxy resin is from 1 to 20% by weight.

The mono-functional organic material should be of molecular weight at least 100 Daltons, preferably from 100 to 350, more preferably from 200 to 270. Suitable examples include organic mono-carboxylic acid such as aliphatic and aromatic mono-carboxylic acids or alkyl phenols. The saturated aliphatic mono-carboxylic acids are preferred as these have the least adverse affect on flavour. Any unsaturation in the acid also tends to produce a deleterious effect on flavour and some discolouration of the modified epoxy resin, the latter characteristic making it difficult to formulate a white coating. Most preferred is myristic acid, also known as tetradecanoic acid, of formula $C_{13}H_{27}CO_2H$, as this has the least effect on flavour tarnish whilst producing a significant reduction in the amount of extractable BADGE and other components below 1000 Daltons molecular weight. Naturally occurring fatty acids such as coconut oil fatty acid may also be used.

The dicarboxylic acid should be of molecular weight less than 300 Daltons, preferably from 30 to 299 more preferably from 50 to 299 and most preferably from 130 to 170. Suitable examples include organic aliphatic and di-carboxylic acids such as succinic acid, maleic acid, tartaric acid and aromatic acids such as phthalic acid. Preferably the dicarboxylic acid has at least one hydroxyl group on the alkyl chain to encourage reaction with the crosslinker during curing of the applied coating composition. More preferably the dicarboxylic acid is tartaric acid.

Although such hydroxyl moieties are in principle capable of reacting with the epoxy moieties, the reaction rate of such hydroxyls relative to the reaction rate of carboxyl with epoxy moieties, is very slow indeed. Hence, where carboxyl and hydroxyl moieties are competing to react with epoxy moieties, the hydroxyl moieties are effectively non-reactive. Thus, for example, tartaric acid which contains two hydroxyl moieties and two carboxylic acid moieties, is regarded as difunctional as only the carboxyl moieties react with the epoxy moieties.

Most preferably, the mono-carboxylic acid is tetradecanoic acid and the di-carboxylic acid is tartaric acid as this produces the best balance of low extractable BADGE, flavour and coating solids.

Some tri-functional organic material may be used or indeed be present adventitiously. However, care must be taken to keep such material to a low level to prevent the modified resin from gelling during manufacture. The level of such tri-functional material is preferably kept below 30% of the dicarboxylic acid calculated on a molar basis.

We have found that the use of high levels of the mono-functional organic material, especially organic mono-carboxylic acid affects the taste of certain foods and beverages and are thus best avoided. Too low an amount, as previously mentioned, does not reduce the BADGE level to the required low level. Conversely, high levels of di-carboxylic acid present in the resin result in increased resin viscosity thereby limiting the maximum solids at which the can coating can be formulated. In order to avoid such problems the relative amount of mono-functional organic material to dicarboxylic acid is preferably from 1.5:1 to 6:1 on a molar basis, more preferably from 3:1 to 12:1, even more preferably from 4:1 to 8:1, and most preferably from 5:1 to 8:1.

The epoxy equivalent weight of the modified epoxy resin is preferably less than 50000, more preferably from 175 to 30000 and even more preferably from 1000 to 15000. Above about 10000, the resin viscosity increases to the extent that the solids of the coating composition must be reduced. This limits the usefulness in commercial applications. Most preferred are modified epoxy resins of epoxy equivalent weight of from 3000 to 10000 as these have the preferred overall balance of properties.

Suitable examples of crosslinkers include resinous crosslinkers such as melamine formaldehyde, phenol formaldehyde, urea formaldehyde, polyphenols such as the Novalac resins, and polyamines. Such crosslinkers will react mainly with the epoxy groups and any hydroxyl groups of the modified resin. Where sufficient epoxy groups are present in the resin, polyfunctional acids such as citric acid or trimellitic anhydride may be used to effect crosslinking.

Preferably the crosslinker is a phenolic resin.

Preferably the crosslinker comprises from 0.5% to 50% based on the non volatile content of the coating composition.

The coating may contain pigment or be pigment-free. Preferably the coating composition is substantially pigment-free, especially when used to coat can interiors.

The coatings can be applied to various substrate materials including metal, especially metal for cans, plastics and glass. They may be applied by conventional means such as brush, dip, spray or roller coating.

Following application to a suitable substrate the coating is preferably crosslinked. This is usually achieved by heating to first drive off any carrier liquid and then to increase the reaction between the modified di-epoxy resin and the crosslinker. Typical conditions used to effect crosslinking include 180 to 220° C. peak temperature for 6 to 12 minutes at peak temperature.

There is also provided a process of producing a crosslinked coating on a metal container characterised in that it comprises the steps of applying a coating according to the invention and causing the coating to crosslink.

There is further provided a metal container, especially a can coated with the coating of the invention.

There is also provided a process for producing the modified epoxy resin of the invention by causing a diepoxy resin of epoxy equivalent weight of from 500 to 5000, formed by the reaction of BADGE and bis phenol A and containing minor amounts of resin components of molecular weight below 1000 Daltons, including extractable BADGE, to react with mono-functional organic material of molecular weight at least 100 Daltons and dicarboxylic acid of molecular weight less than 300 Daltons.

The mono-functional reactive material tends to be slower to react than the di-carboxylic acid. This is especially so when the mono-functional material is a carboxylic acid. Preferably, the mono-functional organic material is caused to react with the diepoxy resin first, the resulting product being reacted with the dicarboxylic acid in a later step. This tends to produce lower viscosity modified resins than when the mono- and di-functional reactive material are reacted as a mixture.

The invention is further illustrated by the following examples of which Examples A, B and C are comparative resin examples and 3C, 4C, 5C, 6C and 7C are comparative coating compositions. Example 1 is a resin of the invention and Example 2 is a coating composition of the invention.

The materials referred to in the examples are listed and are available from the suppliers indicated.

DER 331 is bis phenol A diglycidyl ether (EEW=184-189) and is available from Dow BP42, St Ouen Cedex 93402, France.

DPP is bis phenol A and is available from Dow BP42, St Ouen Cedex 93402, France.

Cyphos 442W is a phosphonium catalyst and is available from Cytec, Syllic 256, Rungis Cedex 94568, France.

MPA is methoxy propanol acetate solvent available from Shell, Chemin Dept 54, 13130 Berre l'Etang, France.

Sol 100 is an aromatic solvent (boiling range 166 to 184° C.) and available from Shell, Chemin Dept 54, 13130 Berre l'Etang, France.

Prifac 7907 is an organic mono-carboxylic acid of 12 to 14 carbons and is available from Unichema of 148, Bld. Haussemann, 75008, Paris, France.

Tartaric acid was obtained from Univar and is available from 17, Ave Louison Bobet, 94132, Fontian sous bois Cedex, France.

BG is butyl glycol and is available from BP, Parc St Christophe-Newton I, 10, Ave. de l'Entreprice, 95866, France.

Butanol is available from Perstorp of 5-7, rue Marcelin Berthlot, 92762 Antony Cedex, France.

SFC112 is a PF crosslinker resin available from Schenectady.

Baysilon PL flow aid is available from Bayer.

LancoGlidd TPG060 is a polyethylene wax available from Lubrizol Corporation.

TEST METHODS

The Method Used to Estimate the Level of Extractable BADGE is as Follows.

A flat steel panel of area 1.5 dm² (equivalent to 0.01 m²) is roller coated with the test coating composition to achieve a dried coating weight of 5 to 7 g/m². After allowing the solvent to flash-off, the coated panel is heated in an oven at 200° C. for 11 minutes to effect curing. After being allowed to cool, the panel is completely immersed in 50 ml of acetonitrile for 24 hours at ambient temperature. The acetonitrile contains 1 microgram/ml of tertiary butyl phenol as a reference standard. The concentration of BADGE and other extractable materials from the coating extracted into the acetonitrile is determined by reverse-phase gradient HPLC (column 125×4 mm stainless steel, Nucleosil 100-5 C18 particle size 5 microns, flow rate of 0.75 ml/minute, 10 microliters injection volume and temperature of 30° C.), with fluorescence detection (excitation at 275 nm, emission 300 nm). A suitable solution of BADGE and any other relevant analytes is run separately as a calibrant and tertiary butyl alcohol is used as an internal standard for both. The eluent gradients are summarised below:

|  | Methanol | Acetonitrile | Water |
|---|---|---|---|
| 0 minutes | 0 | 35 | 65 |
| 30 minutes | 10 | 49 | 41 |
| 45 minutes | 0 | 100 | 0 |
| 55 minutes | 0 | 100 | 0 |

The Method Used to Estimate the Total Extractable Material of Molecular Weight Below 1000 Daltons Follow the same procedure as for estimating BADGE, the quantity being assessed by the total area of the peaks eluted up to and including 47.5 minutes.

The amount of extractable BADGE and total extractable material of molecular weight below 1000 Daltons is calculated and expressed in units of micrograms/m² of dried crosslinked coating.

The Method Used to Assess Any Change in the Flavour of the Contents of a Can.

Four flat steel panels each of size 7×25 cm are prepared according to the method used to estimate the level of extractable BADGE. The coated cured panels are immersed in 500 ml of Evian still mineral water in a glass beaker. The beaker is placed in an autoclave and the temperature raised to 130° C. and held there for 1 hour. The panels are removed and the water is allowed to cool to ambient temperature after which time a skilled taster compares the taste of this water to a blank; that is mineral water which has not had coated panels immersed in it. The water is rated from 1 to 3 relative to the blank with 1 being very similar and thus having little taste and 3 a strong taste.

The Method Used to Assess the Blush Resistance of the Coating Composition.

Coated, flat steel panels of size about 6×6 cm are prepared according to the method used to estimate the flavour. The cured coated panels are then immersed in water containing 3% by weight of sodium chloride and the temperature raised to 130° C. and maintained for 1 hour after which time the panels are removed, allowed to cool for 1 hour and assessed by eye. Any whitening of the coating is noted. Acceptable coatings have no whitening.

The Viscosity was Assessed Using the Falling Ball Method.

A liquid resin or solution of resin is placed in a test tube of about 16 cm in height and 12 mm in diameter and having two marks 10 cm apart. The test tube is immersed in a water bath at 25° C. and left to equilibrate. A 2 mm diameter steel ball weighing 32.5 milligram is dropped into the centre of the test tube and the time taken to pass the two marks is recorded. The viscosity is quoted in seconds.

Epoxy Equivalent Weight is Measured by Titration.

A known amount of the diepoxy resin is dissolved in a suitable solvent and a known amount of tetraethyl ammonium bromide is added. Perchloric acid is added to liberate hydrogen bromide which in turn reacts with any epoxy groups in the resin solution. The remaining hydrogen bromide is determined by titration with perchloric acid using crystal violet as indicator.

The Solids Content of the Resin.

This was determined by weighing a sample of resin before and after heating at 200° C. for 30 minutes.

EXAMPLES

In the following examples the EEW of the di-epoxy resin is first increased from 184-189 to 1700-1800 by reacting with bis phenol A. The resulting di-epoxy resins contain minor amounts of BADGE Example 1

To a 4 liter round bottomed flask fitted with a flat stirrer and condenser was added 311.32 g of DER 331, 158.30 g of DPP, 0.31 g of Cyphos 442 W, 58.70 g of AMP and 58.70 g of Solvesso 100. The contents were heated to a temperature of 168° C. and held until the viscosity of the reaction mixture, measured by the falling ball method as a 40% by weight solution in butyl glycol at 25° C. was from 9 s to 11 s. This is equivalent to an epoxy equivalent weight of approximately 1700 to 1800. Twenty minutes after the desired viscosity was reached 28.83 g of Prifac 7907, 6.11 g of Solvesso 100 and 0.31 g of Cyphos 442 W were added to the reaction mixture. The reaction continued until the falling ball viscosity again reached 10 s to 11 s and the EEW increased to 3600 (about 90 minutes following the addition of Prifac 7907), after which time 3.05 g of tartaric acid was added. The temperature of 170° C. was maintained for a further two and a half hours to complete the reaction. Finally, 230.11 g of butyl glycol, 60.11 g of Solvesso 100 and 84.14 g of butanol were added to dilute to the desired solids of about 50% by weight and then cooled to room temperature.

The resulting modified epoxy resin had the following parameters.
Solids content of 50.2%.
Falling ball viscosity 76 s.
EEW of 7180.
Comparative Modified Resins Three comparative modified resins identified as A, B and C were made according to the method used in Example 1 but using the ingredients and amounts listed in Table 1

TABLE 1

| Ingredient | Resin A parts | Resin B parts | Resin C parts |
|---|---|---|---|
| DER 331 | 331.46 | 331.46 | 331.46 |
| DPP | 168.54 | 168.54 | 168.54 |
| Cyphos 442W | 0.25 | 0.25 | 0.25 |
| MPA | 26.25 | 26.25 | 26.25 |
| Solvesso 100 | 62.50 | 62.50 | 62.50 |
| MPA | 36.25 | 36.25 | 36.25 |
| Tartaric acid | — | — | 3.25 |
| Prifac 7907 | — | 30.70 | — |
| Solvesso 100 | — | 26.10 | — |
| Cyphos 442W | — | 0.25 | — |
| Butyl glycol | 227.50 | 245.00 | 227.50 |

TABLE 1-continued

| Ingredient | Resin A parts | Resin B parts | Resin C parts |
|---|---|---|---|
| Butanol | 82.50 | 88.75 | 82.50 |
| Solvesso 100 | 65.00 | 64.00 | 65.00 |
| Falling ball viscosity (s) | 38 | 36 | 87 |
| Solids (wt %) | 50.4 | 50.2 | 50.6 |
| EEW | 1750 | 3700 | 2240 |

Example 2

Coating Composition

The resin solution of Example 1 was converted to a coating composition, referred to as Example 2, according to the following method.

To a mixing vessel fitted with a stirrer and containing 57.54 parts of the modified epoxy resin of Example 1 was added 21.20 parts of phenol-formaldehyde crosslinker resin SFC112. 1.00 part of 20 wt % phosphoric acid was added as a catalyst for the crosslinking reaction. 1.5 parts of 1 wt % Baysilon PL flow aid and 1.640 parts of LancoGlidd TPG060 to increase surface hardness. The following solvents were then added; 11.110 parts of Solvesso 100, 3.39 parts of butyl glycol, 3.86 parts of butyl acetate, 0.55 parts of isopropanol and 2.36 parts of butanol. The coating composition was stirred for a further 10 minutes following the final addition of solvent.

Comparative resins A, B and C were converted to coating compositions identified as 3C 4C, 5C, 6C and 7C, according to the method used in Example 2 but using the ingredients and amounts listed in Table 2

TABLE 2

| Ingredient | 3C parts | 4C parts | 5C parts | 6C parts | 7C parts |
|---|---|---|---|---|---|
| Resin A | 57.40 | 57.40 | | | |
| Resin B | | | 57.40 | 57.40 | |
| Resin C | | | | | 57.40 |
| SFC 112 | 21.20 | 21.20 | 21.20 | 21.20 | 21.20 |
| Phosphoric acid (20 wt %) | 1.00 | 1.00 | 1.00 | 1.00 | 1.00 |
| Baysilon PL (1 wt %) | 1.50 | 1.50 | 1.50 | 1.50 | 1.50 |
| LancoGlidd TPG 060 | 1.64 | 1.64 | 1.64 | 1.64 | 1.64 |
| Tartaric Acid | — | 0.87 | — | 0.87 | — |
| Solvesso 100 | 7.09 | 6.73 | 7.09 | 6.73 | 7.09 |
| Butyl Glycol | 3.39 | 3.22 | 3.39 | 3.22 | 3.39 |
| Butyl Acetate | 3.86 | 3.67 | 3.86 | 3.67 | 3.86 |
| Isopropanol | 0.55 | 0.52 | 0.55 | 0.52 | 0.55 |
| Butanol | 2.36 | 2.24 | 2.36 | 2.24 | 2.36 |
| Total | 100.00 | 100.00 | 100.00 | 100.00 | 100.00 |

The properties and performance of the crosslinked coating were estimated using the test methods described above and the data is summarised in Table 3

TABLE 3

| | Coating Composition | | | | | |
|---|---|---|---|---|---|---|
| | 2 | 3C | 4C | 5C | 6C | 7C |
| Extractable BADGE (micrograms/dm$^2$) | [1]ND | 30.8 | 28.2 | 1.5 | 0.5 | 9.5 |
| Total material <1000 Da (micrograms/dm$^2$) | 41 | 514 | 538 | 174 | 300 | 375 |
| Flavour | 1 | | | | | |
| Solids content (wt %) | 42 | 42 | 42 | 42 | 42 | 42 |
| [2]Viscosity (s) | 78 | 60 | 65 | 57 | 55 | 89 |

[1]ND means non-detectable (<0.2 micrograms/dm$^2$)
[2]Viscosity measured using ISO 2431 using cup number 6 at 25° C.

All examples had amounts of bis phenol A below the detectable limit of 0.3 micrograms/dm$^2$.

The results show that using a simple unmodified resin produces coatings of high extractable BADGE as well as other resin components of molecular weight below 1000 Daltons. Adding a dicarboxylic acid to the coating does not produce the same benefits as making the resin in the presence of acid. Similarly, making the resin with only a monocarboxylic acid does not produce acceptable performance. In fact, only Example 2 has a level of extractable BADGE in the crosslinked coating below the existing limit of 0.3 micrograms/dm$^2$. Furthermore, the total amount of extractable low molecular weight resin components is also at a minimum.

The invention claimed is:

1. A protective crosslinkable coating composition comprising modified epoxy resin and crosslinker, the modified epoxy resin being the reaction product of
    i) from 80 to 99.9 parts of di-epoxy resin of epoxy equivalent weight from 500 to 5000 and formed from the reaction of bisphenol A diglycidyl ether and bisphenol A and
    ii) from 0.1 to 20 parts by weight of a reactive material characterised in that
    a) the di-epoxy resin contains minor amounts of resin components of molecular weight less than 1000 Daltons and the reactive material comprises
    b) a mono-functional organic material of molecular weight at least 100 Daltons having one moiety capable of reacting with the epoxy moieties of the di-epoxy resin and
    c) a dicarboxylic acid of molecular weight less than 300 Daltons having two moieties capable of reacting with the epoxy moieties of the di-epoxy resin and where the ratio of mono-functional organic material to dicarboxylic acid calculated on a molar basis is from 3:1 to 12:1.

2. A protective crosslinkable coating composition comprising modified epoxy resin and crosslinker the modified epoxy resin being the reaction product, by weight, of
    i) from 80 to 99.9 parts by weight of a di-epoxy resin of epoxy equivalent weight from 500 to 5000 and formed from the reaction of bisphenol A diglycidyl ether and bisphenol A and
    ii) from 0.1 to 20 parts by weight of a reactive material characterised in that
    a) the di-epoxy resin contains minor amounts of resin components of molecular weight less than 1000 Daltons and the reactive material comprises
    b) a mono-functional organic material of molecular weight at least 100 Daltons having one moiety capable of reacting with the epoxy moieties of the di-epoxy resin and
    c) a tartaric acid having two moieties capable of reacting with the epoxy moieties of the di-epoxy resin.

3. A coating composition according to claim 1 characterised in that the resin component of molecular weight less than 1000 Daltons comprises bisphenol A diglycidyl ether.

4. A coating composition according to claim 3 characterised in that the amount of bisphenol A diglycidyl ether extractable from a crosslinked coating of the coating composition is less than 0.3 micrograms/dm$^2$.

5. A coating composition according to claim 1 characterised in that the mono-functional organic material is a mono-carboxylic acid.

6. A coating composition according to claim 5 characterised in that the mono-carboxylic acid is tetradecanoic acid.

7. A coating composition according to any one of claim 3 characterised in that the di-carboxylic acid is tartaric acid.

8. A coating composition according to claim 1 characterised in that the amount of reactive material comprises from 1 to 20% by weight of the modified epoxy resin.

9. A coating composition according to claim 1 characterised in that the modified epoxy resin has at least 30% of the number of epoxy groups as on the diepoxy resin from which it is derived.

10. A process for producing the modified epoxy resin as defined in claim 1 comprising the steps of causing a diepoxy resin of epoxy equivalent weight of from 500 to 5000, formed by the reaction of bisphenol A diglycidyl ether and bisphenol A and containing minor amounts of resin components of molecular weight less than 1000 Daltons to react with a mono-functional organic material of molecular weight at least 100 Daltons and a dicarboxylic acid of molecular weight less than 300 Daltons.

11. A process according to claim 10 characterised in that the mono-functional organic material is reacted with the diepoxy resin in a first step, the resulting product being reacted with the dicarboxylic acid in a later step.

12. A metal container coated with the coating composition according to claim 1.

13. A process of producing a crosslinked coating on a metal container characterised in that it comprises the steps of applying a coating according to claim 1 and causing the coating to crosslink.

14. A modified epoxy resin as defined in claim 1.

15. A modified epoxy resin for reducing the amount of bisphenol A diglycidyl ether extractable from a crosslinked coating composition on the interior surface of a metal container to less than 0.3 micrograms/dm, said modified epoxy resin being as defined in claim 14.

16. A coating composition according to claim 2 characterised in that the resin component of molecular weight less than 1000 Daltons comprises bisphenol A diglycidyl ether.

17. A coating composition according to claim 16 characterised in that the amount of bisphenol A diglycidyl ether extractable from a crosslinked coating of the coating composition is less than 0.3 micrograms/dm$^2$.

18. A coating composition according to claim 2 characterised in that the mono-functional organic material is a mono-carboxylic acid.

19. A coating composition according to claim 18 characterised in that the mono-carboxylic acid is tetradecanoic acid.

20. A coating composition according to claim 2 characterised in that the amount of reactive material comprises from 1 to 20% by weight of the modified epoxy resin.

21. A coating composition according to claim 2 characterised in that the modified epoxy resin has at least 30% of the number of epoxy groups as on the diepoxy resin from which it is derived.

22. A process for producing the modified epoxy resin as defined in claim 2 comprising the steps of causing a diepoxy resin of epoxy equivalent weight of from 500 to 5000, formed by the reaction of bisphenol A diglycidyl ether and bis phenol A and containing minor amounts of resin components of molecular weight less than 1000 Daltons to react with a mono-functional organic material of molecular weight at least 100 Daltons and a dicarboxylic acid of molecular weight less than 300 Daltons.

23. A process according to claim 22 characterised in that the mono-functional organic material is reacted with the diepoxy resin in a first step, the resulting product being reacted with the tartaric acid in a later step.

24. A metal container coated with the coating composition according to claim 2.

25. A process of producing a crosslinked coating on a metal container characterised in that it comprises the steps of applying a coating according to claim 2 and causing the coating to crosslink.

26. A modified epoxy resin as defined in claim 2.

27. A protective crosslinkable coating composition of claim 1 wherein the dicarboxylic acid is selected from dicarboxylic acids having a molecular weight less than from 30 to 299 or from 130 to 170.

28. A protective crosslinkable coating composition of claim 1 wherein the di-carboxylic acid is selected from succinic acid, maleic acid and phthalic acid.

* * * * *